United States Patent [19]
Lieberman

[11] Patent Number: 5,591,504
[45] Date of Patent: Jan. 7, 1997

[54] DISPOSABLE, BIODEGRADABLE AIR FRESHENING DEVICE AND FOOD PRESERVATIVE

[75] Inventor: Fred S. Lieberman, Rochester Hills, Mich.

[73] Assignee: DJM No. 7, Inc., Mt. Clemens, Mich.

[21] Appl. No.: 434,323

[22] Filed: May 2, 1995

Related U.S. Application Data

[63] Continuation of Ser. No. 71,585, Jun. 2, 1993, abandoned.

[51] Int. Cl.$^6$ ..................................... B65D 81/26
[52] U.S. Cl. ..................... 428/68; 428/34.8; 426/323; 426/326; 206/204
[58] Field of Search ..................... 428/68, 318.8, 428/34.8, 35.7, 213; 426/323, 324, 326, 419; 206/204, 484, 484.2; 220/415

[56] References Cited

U.S. PATENT DOCUMENTS

| | | | |
|---|---|---|---|
| 4,036,360 | 7/1977 | Deffeyes | 206/204 |
| 4,423,080 | 12/1983 | Bedrosian et al. | 426/124 |
| 4,645,698 | 2/1987 | Matsubara | 428/68 |
| 4,755,178 | 7/1988 | Insley et al. | 604/367 |
| 4,992,326 | 2/1991 | Dabi | 428/283 |
| 5,064,698 | 11/1991 | Courtright et al. | 428/35 |
| 5,084,337 | 1/1992 | Someya | 428/323 |

*Primary Examiner*—Daniel Zirker
*Attorney, Agent, or Firm*—Young & Basile, P.C.

[57] ABSTRACT

A disposable, biodegradable material for use as an air freshener in a closed container and/or for use in containers containing perishable food products which includes an elongated sheet having an upper face and a lower face which is composed of a cellulosic material present as a plurality of randomly intermeshed fibers. The elongated sheet contains a hygroscopic absorptive material attached thereto.

15 Claims, No Drawings

DISPOSABLE, BIODEGRADABLE AIR FRESHENING DEVICE AND FOOD PRESERVATIVE

This application is a CONTINUATION of application Ser. No. 08/071,585, filed on Jun. 2, 1993, now abandoned.

BACKGROUND OF THE INVENTION

1. Field of the Invention

The present invention relates to a wrapping sheet for perishable goods and more particularly to a wrapping sheet which has the capability of maintaining freshness of perishable goods. Furthermore, the present invention relates to a disposable, biodegradable sheet which can be employed in closed containers as an air freshening device.

2. Description of the Relevant Art

A variety of methods have been employed for keeping perishable goods in a preferable condition in terms of their freshness, etc., during transportation or storage. Additionally, a variety of methods have been employed for controlling odor in closed containers; particularly containers which store biologically derived material such as food products, food waste, and biological waste such as would be found in diaper pails.

At its most simple, odor reduction has been attempted by placing open containers of baking soda material containing sodium bicarbonate in closed volumes such as in refrigerators or freezers. Additionally, in an attempt to control odors, baking soda material has been sprinkled into containers such as garbage cans, diaper pails or the like. These odor reduction methods have undesirable side effects. In the case of placing an open container of baking soda employed in a closed volume such as a refrigerator, the material is prone to be spilled during jostling or arrangement of the food products therein. Additionally, the large container of baking soda provides an inefficient odor reduction media due to the small outer surface area of baking soda actually exposed to the odor causing agents.

In the case of diaper pails, garbage cans and the like, a relatively small volume of baking soda is sprinkled loosely in the bottom of the container. Such methods provide no control over the amount of baking soda employed from container to container and also increases the risk of spillage and also uncontrollable generation of dust as the baking soda is introduced. Finally, the previously proposed methods and devices lack any capacity for absorbing liquid material inadvertently generated in the container. The presence of such unwanted liquid material can be quite undesirable and actually neutralize the effectiveness for the baking soda.

In U.S. Pat. No. 3,084,337 to Someya a packaging material for perishable goods is proposed which comprises a polyethylene or paper sheet into which coral sand granules are impregnated. The sheet can be made into a bag for packaging perishable food stuffs. The coral sand employed has a grain size in the range of 100 to 2000 mesh and evidences a large number of pores having a diameter ranging from about 10 to about 50 micrometers to permit access to active sites on each granule. Coral sand is a hard stony substance formed from the mass skeletons of marine organisms and contains calcium carbonate as its main ingredient with calcium phosphate as its secondary ingredient and trace constituents of magnesium, potassium, iron, sodium strontium and the like also being present. The coral sand employed in this invention is actually contained within the packaging material.

Other references discuss the use of complex polymeric materials, adsorbents or desiccants in sheets which can be employed or with food products. These include U.S. Pat. No. 4,645,698 to Matsubara which discloses a dehydrating and water retaining sheet having a water absorbing agent comprised of a polymeric material which forms a hydrous gel. The sheet also includes a water permeable membrane. U.S. Pat. No. 5,064,698 to Courtright discloses a food packaging material which has a plurality of porous polymeric beads contained therein. The beads are impregnated with an antioxidant or oxygen scavenger compound such as iron oxide, BHA, BHT or glucose oxidase. U.S. Pat. No. 4,036,360 to Deffeyes discloses a package which comprises a desiccant material which consists essentially of a desiccant and a tough film forming resin having a high moisture vapor transmission rate; i.e. pre-polymerized polyurethane.

However, no references have been found which teach or suggest a fiber substrate sheet having active sodium bicarbonate stably attached at or adjacent to at least one surface. Thus, it would be desirable to provide a sheet which could be employed in closed containers and would contain sodium bicarbonate securely attached thereto. It would also be desirable that the sodium bicarbonate be present in crystalline or semi-crystalline form and be actively available for the absorption and neutralization of unpleasant odors as well as being present as a perishable food product preservative agent. It would also be desirable that the product be disposable and biodegradable upon such disposal. Finally, it would be desirable that such a product be capable of being produced in an efficient and inexpensive manner.

SUMMARY OF THE INVENTION

The present invention is a disposable, biodegradable material which can be used as an air freshening agent and/or as a preservative for perishable food products. The material is particularly adapted for use in closed containers. The material comprises an elongated sheet having an upper face and an opposed lower face in which the sheet is composed of numerous naturally occurring randomly intermeshed fibers; and an absorptive material attached to the sheet which consists essentially of solid sodium bicarbonate.

DETAILED DESCRIPTION OF THE INVENTION

The present invention is a sheet which can be employed as an air freshening material and/or a preservative material for use in containers containing perishable food products. The sheet is disposable and biodegradable.

The disposable material of the present invention comprises:

- an elongated sheet having an upper face and a lower face which is composed of numerous naturally occurring randomly intermeshed fibers; and
- a hygroscopic absorptive material attached to the sheet, the hygroscopic material consists essentially of sodium bicarbonate.

The elongated sheet employed in the present invention is generally comprised of naturally occurring fibers, such as those derived from wood pulp, having an average length between about 0.01 and about 0.80 inches and an average diameter between about 0.0006 and about 0.001 inches. The naturally occurring fibers are intermeshed to form an essentially solid sheet having a plurality of interstices located randomly throughout; the interstices having average sizes between about 0.0009 and about 0.0030 inches. Preferably, the fibers combine to form a paper sheet having a mesh size between about 300 and about 600 per cm$^2$.

The naturally occurring fibers employed in the present invention are preferably cellulosic derived from wood pulp or other wood products. The material preferred for use in the present invention is a paper product having a weight between about 0.0005 and about 0.0015 gm/mm$^2$. The sheet employed herein, preferably, has a maximum thickness between about 5 and about 10 mm. The length of the elongated sheet may be varied depending upon the desired end use application. However, it is preferred that the elongated sheet have a maximum length suitable for insertion into a variety of closed containers. Thus, a size of about 12 inches wide and a continuous length with appropriate perforations to any desired length is preferred when the product produced is directed to end-use consumers. Examples of suitable paper products which can be successfully employed in the present invention include paper toweling commercially available from Scott Paper Company, Philadelphia, Pa. under the trade name SCOTT RAGS. While it is preferred that the cellulosic fibers be derived from wood pulp and other wood products, it is also to be considered within the purview of this invention that the naturally occurring fibers include materials derived from cotton, silk, flax and other naturally occurring fibrous material. Wood-derived fibers can be employed independently in preparing the elongated sheet or can be employed in combination with other naturally-derived fibrous material.

In the present invention, the fibers are randomly oriented and intermeshed to form the elongated sheet. In this, the materials are generally non-woven and can be separated one from the other by tearing.

The elongated sheet of the present invention preferably has an upper face and an opposed lower face. The upper face may include a plurality of indentations defined thereon. These indentations may be positioned in an intermittent manner along the upper face of the elongated sheet in the form of dimples, depressions or the like. The indentations may be randomly positioned or may be more uniformly positioned throughout the upper face of the elongated sheet. Such indentations may be employed to increase the surface area of the sheet and maximize air flow between the sheet and products positioned thereon.

The device of the present invention may also include an optional membrane material adhered to the second face of the elongated sheet in any suitable manner. The lower membrane may be composed of a water-resistant or water impervious material such as a polyethylene, polypropylene film or the like.

The product of the present invention also includes a hygroscopic absorptive material which is suitably attached to the elongated sheet on or immediately adjacent to its upper face consisting essentially of sodium bicarbonate. Preferably, the sodium bicarbonate is attached to the elongated sheet in the form of fine crystalline particles, a portion of which are positioned in interstices defined in the sheet and around various discrete cellulosic fibers found in and on the sheet. The sodium bicarbonate present on the elongated sheet may be in the form of true crystals or may be in a more amorphous, solid semi-crystalline form. The sodium bicarbonate particles preferably have a diameter between about 1 μm and about 200 μm.

In the preferred embodiment of this invention, the sodium bicarbonate is present on the sheet in an amount up to that amount above which the sodium bicarbonate would flake off or be readily dislodged. In actual practice, this amount is between about $1 \times 10^{-5}$ and about $4 \times 10^{-5}$ grams/mm$^2$ of the sheet with an amount between about 0.00002 and about 0.00003 gms/mm$^2$ being most preferred. In order to increase the activity and availability of the sodium bicarbonate, it is preferable that at least 80% of the crystalline particles be concentrated within 0.5 mm of the upper face of the sheet with an amount between about 70 and about 80% being present directly on the surface of the upper face.

Without being bound to any theory, it is believed that the hygroscopic adsorptive nature of the sodium bicarbonate absorbs various odor causing agents and renders them neutral in a reaction which converts noxious gaseous odor causing agents containing, among other things, hydrogen sulfide into more neutral carbon-containing components. Additionally, the bicarbonate material serves to act upon the atmosphere of the closed container or the atmosphere surrounding the food product converting the atmosphere from mildly acidic to slightly alkaline. The alkaline atmosphere which suppresses oxidation of fresh food goods, maintains the freshness of the product and suppresses odor generation. Without being bound to any theory, it is also believed that the presence of sodium bicarbonate also interacts with ethylene-containing compounds produced during the ripening process which, if left unchecked serve to accelerate the naturally occurring ripening process; particularly as it takes place in closed containers. By positioning the sodium bicarbonate immediately adjacent to the upper face of the elongated sheet, a large quantity of the material readily accessible to reaction with surrounding gasses and the like.

The product of the present invention can be used as a disposable air freshening media for use in closed containers such as vegetable drawers in refrigerators, garbage pails, and the like by placing the sodium bicarbonate-containing sheet in the container with its lower face directed toward the inner container surface. The product can also be employed in microwave ovens to prevent the build-up of odors in those units. One advantage of this product when it is employed in microwave ovens is that it can remain in place during oven operation without adverse effects. Thus, the product of the present invention can provide air freshening before, during and after operation of the unit.

Where the product is employed as a freshness enhancing agent, a food product such as an individual piece of fruit or vegetable may be brought into releasable contact with the upper face of the product. The food product may be wrapped or overlain with the product of the present invention. Since the hygroscopic absorptive material of the present invention is generally recognized as safe for human consumption, contact between the two materials would also be considered safe and appropriate. The food product can, then, be positioned in an appropriate food container such as a bag or the like for storage. Prior to consumption, the food product can be removed from contact with the disposable preservative sheet of the present invention. The preservative sheet can, then, be reused or discarded as desired.

The product of the present invention can be produced by contacting a suitable elongated sheet composed of naturally occurring, randomly intermeshed fibrous material with a solution consisting essentially of water and sodium bicarbonate. The sheet can then be dried, permitting the recrystalization of the sodium bicarbonate dissolved in water such that the resulting sodium bicarbonate crystals which form upon evaporation contact in the material in the elongated sheet. These crystals form in interstices and adhere to the fibers found in the fibrous material.

The initial sodium bicarbonate solution is, preferably, prepared from an admixture of distilled water with an amount of sodium carbonate between about 10% by weight and the sodium bicarbonate saturation point. It is to be understood that the saturation point of sodium bicarbonate will vary depending upon the temperature of the water. In the present invention, the water employed can be between a temperature of about 68° F. and about 85° F. In the preferred embodiment, the sodium bicarbonate solution is introduced into contact with the absorptive material by spraying the solution onto the first face of the elongated sheet of absorptive material until the sheet is saturated with the bicarbonate solution. In this manner, an amount between about $2 \times 10^{-5}$ and about $3 \times 10^{-5}$ grams of sodium bicarbonate are introduced per square millimeter of the absorptive material.

The following examples of the invention are provided by way of explanation and illustration. They are not intended to be limitative thereof.

EXAMPLE I

Several sodium bicarbonate sheets were made according to the method of the present invention by spraying a solution containing 10 mg of commercial grade sodium bicarbonate dissolved in 90 ml of water onto paper sheeting commercially available from Whatman Co. of Hillsboro, Oreg. under the brand name Whatman #41 Ashless Filter Paper. The material was allowed to dry and was visually inspected. A slightly gritty upper surface was detected by touch. The respective sheets were vigorously shaken and no appreciable amount of solid material was dislodged therefrom. A representative sheet was then inspected under magnification. It was noted that the paper toweling included a crystalline or semi-crystalline solid material which was bonded around various fibers of the paper toweling. Reticule particle distribution ranged from 0.0005 inch to non-discernable particles under a magnification of 30x. Upon viewing the same filter at 450x through a Nomarski light field/dark field polarizing microscope with no reticule, the smallest particle was still to small to distinguish.

The representative paper sheeting is then submerged in boiling water to recrystallize the solid material found thereon. The material is then recrystallized by evaporation. The solid material is weighed. The solid material is then analyzed and found to be sodium bicarbonate. The amount of sodium bicarbonate per square inch of paper toweling is calculated. The percent recovery is between 60 and 80%.

EXAMPLE II

In order to determine the efficiency of the present invention, a sodium bicarbonate sheet prepared according to the process outlined in Example I is placed into a closed container together with an unbruised tomato weighing 7 oz. Tomatoes harvested on the same day of approximately the same size are placed in two other closed containers. The first container has an open cylindrical ampule of 0.05 grams of sodium bicarbonate, an amount essentially equal to that amount used in the sodium bicarbonate sheet. The third container has an ampule containing 2 grams of sodium bicarbonate. A fourth container is prepared having an amount of sodium bicarbonate contained loosely therein equal to that employed in the sodium bicarbonate sheet of the present invention. The fifth container contains 2 grams of loose sodium bicarbonate. The containers were sealed and maintained at a constant temperature of 60° F. The tomatoes are inspected after fifteen days to determine freshness and preservation. The tomatoes in the containers having ampules of sodium bicarbonate show marked deterioration of the skin and softness of the fruit material. The tomatoes contained in the containers having the sodium bicarbonate scattered therein also show marked deterioration of the skin and softness of the fruit. The tomato sheathed in the sheet of the present invention shows superior fruit qualities and preservation of the skin.

Having thus described the present invention what is claimed is:

1. A device for holding perishable food products comprising:

a container unit having an inner volume with a gaseous environment adapted to removably receive the perishable food products therein;

an elongated sheet present in said container, said elongated sheet having an upper face and a lower face, said sheet composed of numerous naturally occurring randomly intermeshed fibers, said fibers defining interstices in said sheet; and an inorganic crystalline hygroscopic material attached to said sheet, said inorganic crystalline hygroscopic material directly interactive with said gaseous environment in said container unit, wherein a portion of said inorganic hygroscopic absorptive material is positioned in said interstices and a portion of said inorganic hygroscopic material is positioned around and is bonded directly to said naturally occurring randomly intermeshed fibers of said sheet and wherein, said inorganic crystalline hygroscopic material is water soluble and consists of sodium bicarbonate.

2. The device of claim 1 wherein said fibers of said sheet are cellulosic fibers having an average diameter between about 0.0006 and about 0.001 inches and length between about 0.010 and about 0.800 inches, said cellulosic fibers being intermeshed to form a sheet having a plurality of randomly positioned interstices having sizes between about 0.0009 and about 0.0030 inches.

3. The device of claim 2 wherein said sheets contains between about 0.00002 gms and about 0.00003 gms of said hygroscopic absorptive material per square millimeter of said sheet.

4. The device of claim 3 wherein said hygroscopic material is present on said sheet as discrete particles bonded directly to said cellulosic fibers.

5. The device of claim 4 wherein said sheet has a maximum thickness between about 5 and about 10 mm and at least 75% of said inorganic hygroscopic sodium bicarbonate material is concentrated within 0.5 mm of said upper face of said sheet, the inorganic hygroscopic sodium bicarbonate material being directly contactable with the gaseous container environment.

6. The device of claim 1 wherein said sheet is composed of cellulosic fibers intermeshed form randomly positioned interstices size between about 0.0009 and about 0.0030 inches, said sheet having a maximum thickness between about 5 and about 10 mm; and wherein said inorganic hygroscopic material is present as discrete crystalline particles, each particle formed around and directly in contact with at least one discrete cellulosic fiber.

7. The device of claim 6 wherein said first face of said sheet has a plurality of indentations defined thereon; and wherein at least 75% of said crystalline particles are concentrated within 0.5 mm of said upper face of said sheet.

8. The device of claim 7 wherein said sheet contains between about 0.00002 and about 0.00003 grams of hygroscopic sodium bicarbonate material per square millimeter of said sheet.

9. The device of claim 8 wherein said fibers of said sheet are cellulosic fibers having an average diameter between about 0.0006 and about 0.0010 inches and an average length between about 0.010 and about 0.800 inches.

10. A disposable, biodegradable preservative material for use in containers containing perishable food products and an essentially closed gaseous atmosphere, said preservative material consisting of:

an elongated sheet having an upper face adapted to come into removable contact with the food product, a lower face adapted to come into removable contact with the container, said elongated sheet composed of a cellulosic material having a plurality of randomly oriented channels disposed therein through which gaseous material may pass; and an inorganic water soluble crystalline absorptive sodium bicarbonate material adhering directly to said cellulosic material, said water soluble crystalline sodium bicarbonate material in direct contact with said closed gaseous atmosphere to suppress oxidation of fresh food goods and suppress odor generation.

11. A disposable, biodegradable preservative material for use in containers containing perishable food products and an essentially closed gaseous atmosphere, said preservative material consisting of:

an elongated sheet having an upper face adapted to come into removable contact with the food product, a lower face adapted to come into removable contact with the container, said elongated sheet composed of a cellulosic material having a plurality of randomly oriented channels disposed therein and a plurality of indentations positioned in said upper face through which gaseous material may pass;

wherein said elongated sheet is composed of biodegradable randomly oriented cellulosic fibers having an average diameter between about 0.0006 and about 0.0010 inches and a length between about 0.010 and about 0.800 inches and said sheet further having a plurality of indentations defined on said upper face; and an inorganic water soluble crystalline absorptive sodium bicarbonate material adhering directly to said cellulosic material said water soluble crystalline sodium bicarbonate material capable of interaction with the closed gaseous atmosphere to suppress oxidation of fresh food goods and suppress odor generation.

12. The preservative material of claim 11 wherein said water soluble crystalline absorptive material has an average size between about 1 μm and about 200 μm and is dispersed over said elongated sheet in an essentially uniform manner such that at least 75% of said material is located within 0.5 mm of said upper face.

13. The preservative material of claim 11 wherein said water soluble crystalline absorptive material is present in an amount between about 0.00002 and about 0.00003 gms per square millimeter of said elongated sheet.

14. The preservative material of claim 11 wherein said sheet is composed of cellulosic fibers intermeshed to form a mesh size between about 300 and about 600 cm$^2$, said sheet having a maximum thickness between about 5 and about 10 mm.

15. A disposable air freshening material for use in closed containers, the disposable air freshening agent consisting of:

an elongated sheet having an upper face and a lower face, said sheet composed of numerous cellulosic randomly intermeshed fibers, said cellulosic fibers having an average diameter between about 0.0006 and about 0.001 inches and a length between about 0.010 and about 0.800 inches, said cellulosic fibers being intermeshed to form a sheet having a plurality of randomly positioned interstices having an average size between about 0.0009 and about 0.0030 inches, said elongated sheet having a maximum thickness between about 5 and about 10 mm; and an inorganic hygroscopic absorptive material consisting essentially of discrete solid crystalline particles of sodium bicarbonate bonded directly to said cellulosic fibers, said crystalline particles having an average size less than about 0.0005 inch.

* * * * *